Aug. 18, 1953   C. H. BROWN   2,648,921
FLUID PRESSURE OPERATOR FOR ROLL-OVER SCRAPERS
Filed June 30, 1948   3 Sheets-Sheet 1
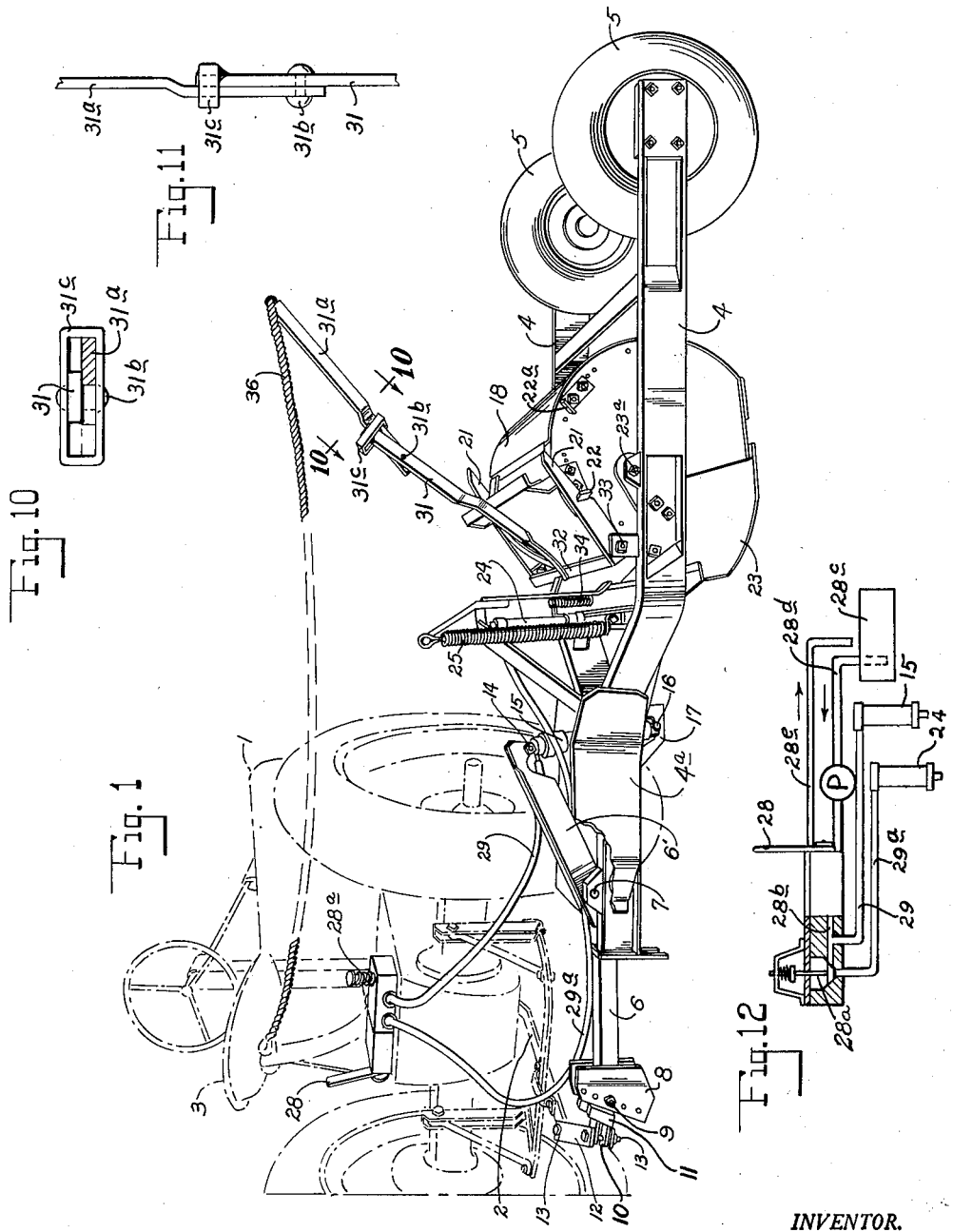
INVENTOR.
Charles H. Brown
BY
Wayland D. Keith
HIS AGENT

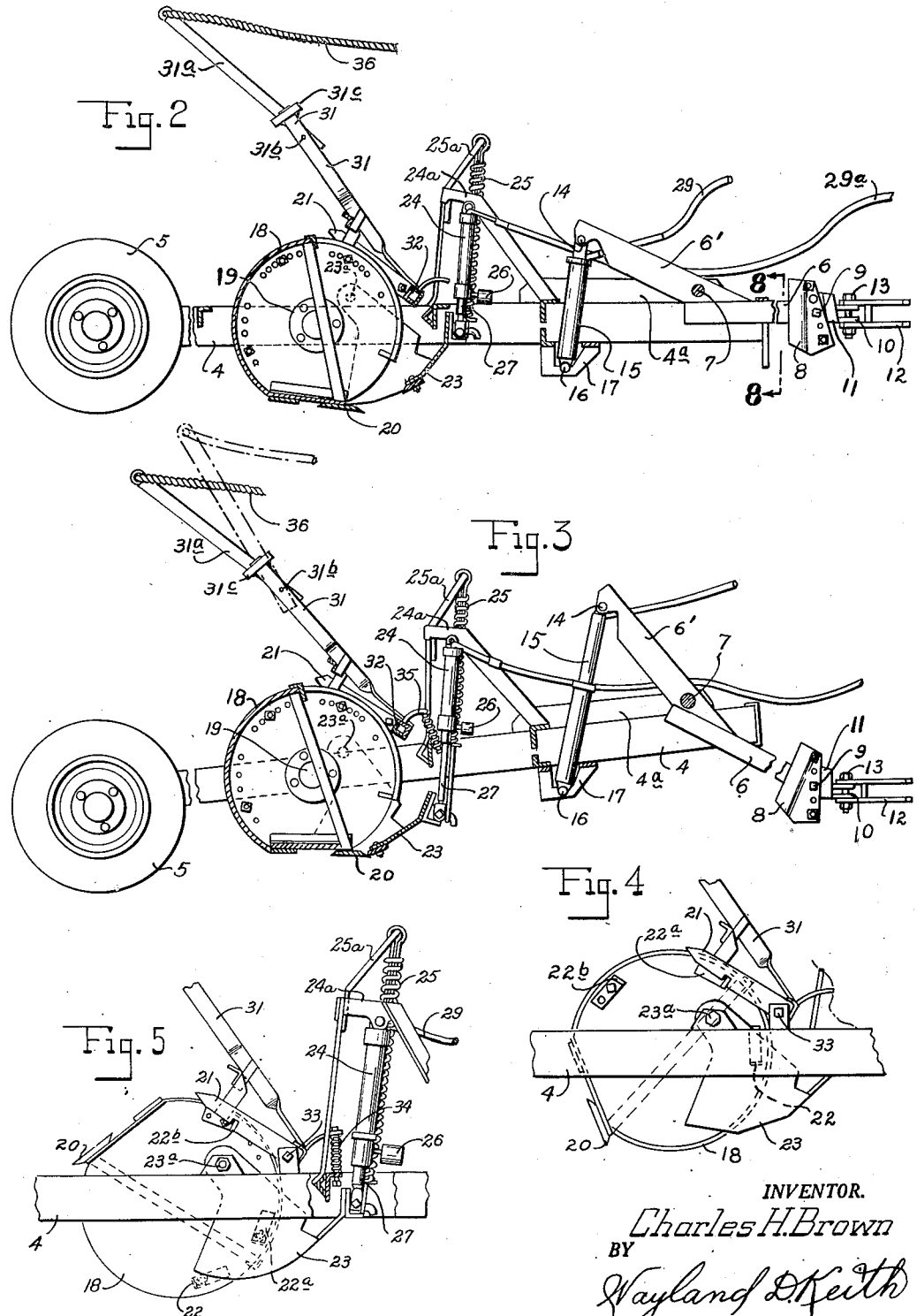

Aug. 18, 1953 C. H. BROWN 2,648,921
FLUID PRESSURE OPERATOR FOR ROLL-OVER SCRAPERS
Filed June 30, 1948 3 Sheets-Sheet 3
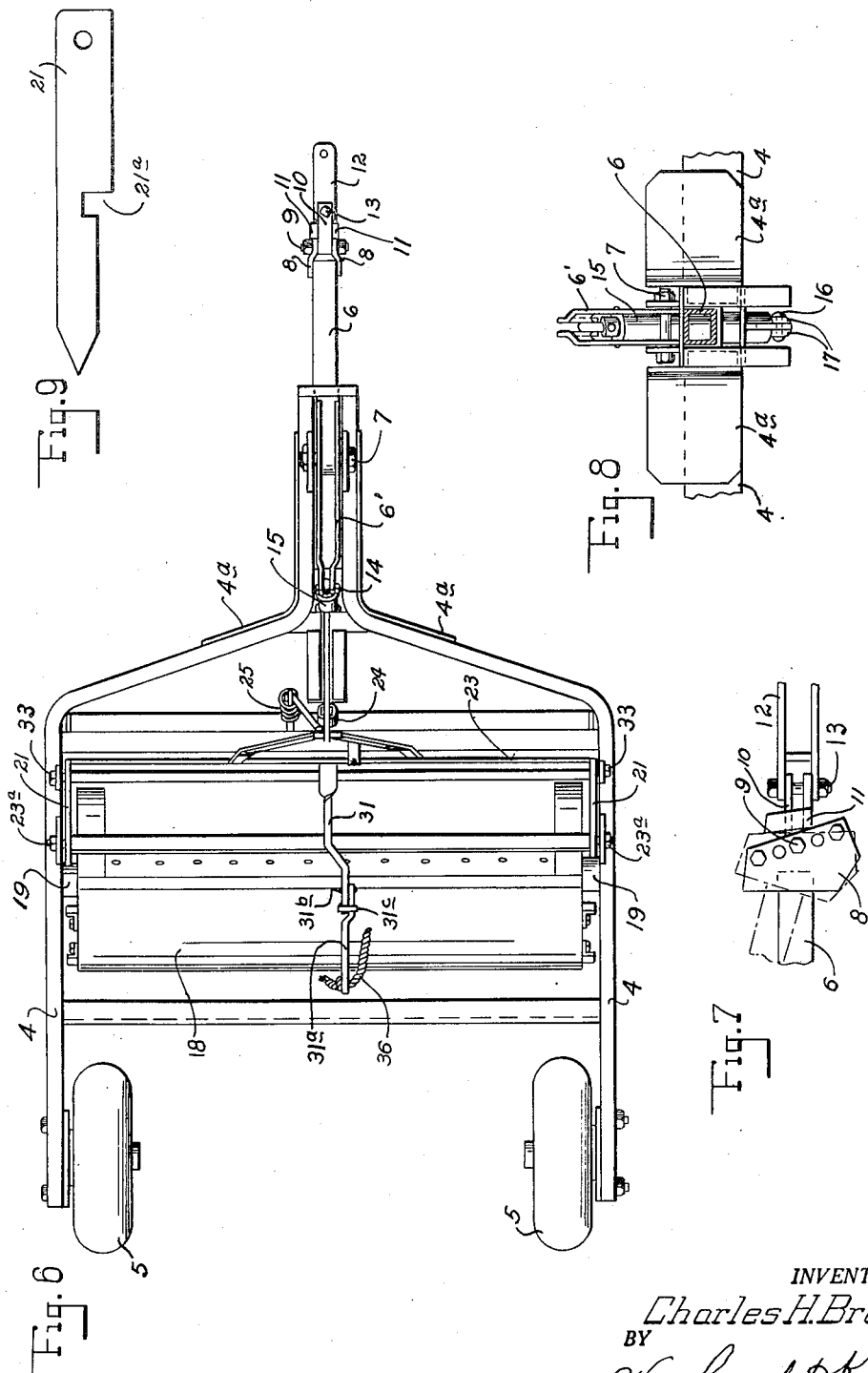
INVENTOR.
Charles H. Brown
BY
Wayland D. Keith
HIS AGENT

Patented Aug. 18, 1953 2,648,921

UNITED STATES PATENT OFFICE 2,648,921

FLUID PRESSURE OPERATOR FOR
ROLL-OVER SCRAPERS

Charles H. Brown, Breckenridge, Tex.

Application June 30, 1948, Serial No. 36,143

8 Claims. (Cl. 37—129)

This invention relates to improvements in rollover scrapers, and more particularly to an implement known in the art of dirt moving and construction as a "Fresno."

While various forms of roll-over scrapers or Fresnos have been proposed heretofore, these have lacked flexibility, adaptability and ease of control, which would make them suitable for use with tractors and particularly the agricultural type of tractor.

The primary object of this invention is to provide a Fresno which may be controlled hydraulically and manually so as to dig, carry, spread, and dump earth at the discretion of the operator, as dictated by the particular type of work being done.

Another object of the invention is to provide an earth moving implement which is wheeled for easy transportation and which is adaptable for connection to a tractor.

The present invention provides a Fresno mounting, the rear end of which is a wheeled carriage, which wheeled carriage mounting follows behind the scraper bowl and makes possible the handling thereof by a much smaller tractor than has been possible heretofore. The front end of the mounting is adapted for flexible connection with the drawbar of a tractor. The present Fresno is provided for various adjustments, both set adjustments and operating adjustments.

Also, by the proper adjustments for close control, a tractor of less horsepower than has been possible heretofore can be readily and safely used to do the work.

An embodiment of this invention is illustrated in the accompanying drawings in which:

Fig. 1 is a perspective view of the Fresno embodying this invention, taken from the side and above, and showing the Fresno connected to a tractor which is shown in dot-dash outline;

Fig. 2 is a longitudinal sectional view through the Fresno, with the Fresno shown in "fill" or "digging" position;

Fig. 3 is a view similar to Fig. 2 except that the Fresno is shown in "carrying" position;

Fig. 4 is a fragmentary side elevation of the implement showing the dirt carrying scraper in an earth "spreading" position;

Fig. 5 is a view similar to Fig. 4 but with the dirt carrying scraper shown in full "dump" position;

Fig. 6 is a top plan view of the implement;

Fig. 7 is a fragmentary view of the front end of the tongue;

Fig. 8 is a detail cross section taken on the line 8—8 of Fig. 2;

Fig. 9 is a side elevation of the scraper positioning pawl, detached;

Fig. 10 is a detail cross section taken on the line 10—10 of Fig. 1 looking in the direction indicated by the arrows;

Fig. 11 is a fragmentary elevation of a portion of pawl lever; and

Fig. 12 is a diagrammatic view of the hydraulic system, with parts shown in section.

With more detailed reference to the drawings, the numeral 1 designates generally a conventional farm type tractor, having a drawbar 2 attached to the rear thereof. The tractor has the usual operator's seat 3 and has a hydraulic pump P for supplying the hydraulic medium for operating the hydraulic cylinders on the Fresno, as will be described more fully hereinafter.

The Fresno has a pair of side frame members 4, each of which has a wheel 5 journalled on the rear end thereof. The front ends of these frame members 4 converge into side-by-side relation and have a tongue 6 pivotally secured on a pivot pin 7 therebetween.

Plates 4a are provided on either side of the frame 4 to provide a broad smooth surface to prevent injury to the tires of the tractor and to the machinery, when turning on short radius, should the tractor tires engage the frame.

A pair of plates 8 (Fig. 7) are secured to opposite sides of the front end of the tongue 6, as by welding. These plates are provided with a series of holes for selectively receiving a bolt 9 that connects a clevis extension 10 on the forward end of the tongue 6, in order to obtain the normal operating position of the Fresno with respect to the type of earth being worked, the moisture condition thereof, and the particular height of drawbar on the tractor.

The clevis or forward portion 10 being pivotally connected with the main tongue 6 by the bolt 9, also permits vertical pivoting action thereabout.

The clevis extension 10 has a pair of lugs 11 welded on opposite sides thereof, which lugs are spaced a short distance from the plates 8 when the extension 10 is in one position, but when this extension 10 is moved about the pivot bolt 9 in either direction with respect to the tongue 6, the lugs 11 are adapted to engage plates 8 so as to cause a positive movement of the tongue 6 therewith, as shown in full lines and in dot-dash outline in Fig. 7.

The front end of the clevis portion 10 has a linkage hitch 12 which is adapted to be connected to the drawbar 2 of the tractor, by bolts 13, which bolts form pivots on vertical axes, which makes possible the turning of the Fresno and tractor in a short radius, as indicated in Fig. 1.

The tongue 6 is pivotally mounted at its rearward end between the frame members 4 on the pivot pin 7 that extends through an offset arm 6' on the tongue. The arm 6' of the tongue is pivotally connected at 14 with a hydraulic power device 15. The lower end of the power device 15 is pivotally connected at 16 to a plate 17, which plate is supported on the frame members 4.

A cylindrical bowl 18, which forms a dirt receiving chamber, is rotatably mounted on trunnions 19 between the frame members 4, so that the bowl may be rotated under certain conditions. The Fresno is adapted to perform four functions. One of these functions is to dig or loosen earth and gather it into the bowl 18, as shown in Fig. 2, with blade 20 adapted to engage the ground as the Fresno is moved forward by the tractor 1. In this position, the hydraulic power device 15 is positioned so as to permit the blade 20 to engage the ground and with the bowl 18 maintained in a set position by pawls 21 engaging stops 22, 22a or 22b, on each end of the bowl, the bowl 18 is filled with earth loosened by the blade. The pawls 21 have notches 21a (Fig. 9) therein, in positions for holding engagement with the respective stops. These stops are secured to the end members of the bowl 18, by bolts in such manner that indicated adjustments may be made of the stops 22, 22a and 22b.

The blade 20 is detachably secured to the bowl 18 in such manner that it may be reversed. Therefore when one edge thereof becomes worn the blade is reversed and the other cutting edge put into operating position, thereby doubling the operating life of the blade.

A swinging door 23 is pivoted to frame 4 on pivots 23a and is adapted to normally close the front of the bowl 18 with a scooping action to scoop loose dirt that is always piled up ahead of the bowl into the bowl with the swinging door 23 closing against blade 20 before the hydraulic power device 15 begins to lift the tongue 6. The swinging door 23 is closed by the action of hydraulic power device 24, and the dirt is retained in the bowl 18 for transportation. The hydraulic power device 24 is supported on a frame bracket 24a at its upper end, which bracket also carries on a member 25a a coiled expansion spring 25, acting under tension in a downward direction lengthwise of the hydraulic power device 24. The lower end of the spring 25 acts to move a rod 27 which is connected with the swinging door 3, as shown in Figs. 2, 3 and 5.

Certain operations make it desirable to raise the frame 4 and bowl 18 a predetermined amount without closing door 23. If the blade 20 digs deeper than the tractor can pull, the blade may be raised slightly without closing the door by closing valve 28a and opening valve 28 which will direct hydraulic fluid from reservoir 28c through conduit 28d, pump P, through valve 28, through passage 28b into line 29 and into hydraulic cylinder 15 to cause a lifting action on tongue 6' which will raise frame 4 and bowl 18 to lift blade 20 the desired distance, until the load on the tractor is sufficiently minimized so that the tractor can pull the scraper at the desired depth for loading.

The hydraulic pump P (Fig. 12), located on the tractor, is designed to pick up liquid from reservoir 28c by pipe 28d and discharge it through a valve 28 to conduit 28b and to lines 29 and 29a leading to hydraulic power devices 15 and 24. By positioning valve 28 in a desirable position, the fluid from the pump P and the lines 29 and 29a may be bypassed through line 28e back to sump 28c.

An air accumulator 26 is provided on the lower end of the hydraulic power device 24 and is connected therewith. This accumulator enables the air within the cylinder to be compressed into the air accumulator 26 under pressure, whereby, upon opening the swinging door 23 by the return of the hydraulic plunger 27, the air will assist the spring 25 in returning the plunger and opening the swinging door. At the same time, the dirt is prevented from entering the cylinder of the power device 24, because the same air is forced back into the cylinder that was previously expelled into the accumulator. This prevents the dirt from becoming intermixed with the air, which, otherwise, would cause the cylinder to wear rapidly, as it is necessary to position the cylinder immediately forward of the scraper element.

It is preferable to use single acting hydraulic power devices 15 and 24 connected through lines 29 and 29a to a pump P, and for a purpose to be described, the cylinder of the power device 15 has a greater cross-sectional area than that of the hydraulic power device 24. A valve 28 is positioned intermediate the pump P and the power devices 15 and 24 and is common to both power devices. A valve 28a is connected with the branch line 29a for the individual control of the power device 24. When desired, the valve 28, which is a three-way valve, may be opened to direct a hydraulic medium from reservoir 28c through line 28d, through valve 28 into both of the power devices 15 and 24, simultaneously. However, due to the distribution of the load on the power devices 15 and 24, the power device 24 is designed to operate first. As a matter of positive operation, a valve 28a is connected with branch line 29a so as to close off the flow of the hydraulic medium to cylinder 24 so that the hydraulic power device 15 may be independently actuated.

By the manipulation of three-way valve 28, the hydraulic medium may be released from hydraulic power devices 15 and 24 simultaneously, and the fluid will pass out through line 28e and return to sump 28c.

A lever 31 is mounted on the Fresno and has the lower end thereof rigidly fixed to a bar 32, which bar 32 has a pawl 21 rigidly secured to each end thereof. The bar 32 is journaled on bolts 33 supported on the frame 4 which makes possible the raising and lowering of pawls 21 by the action of lever 31. A spring tension device 34 acts upon the bar 32 so as to exert a downward tension on the free ends of pawls 21 to cause the pawls to slidably engage the stops 22, 22a and 22b, respectively, upon rotation of bowl 18. The lever 31 has an extension 31a pivoted at 31b to the upper end thereof. A loop 31c is provided above pivot 31b, at the upper end of lever 31, and is secured thereto by welding. This loop 31c encircles lever extension 31a so as to permit a limited swinging movement of lever extension 31a, as indicated in Fig. 3 by dot-dash outline. This swinging action permits a blow to be imparted to the upper end of the lever 31 by a jerk of rope 36, which rope 36 is attached to the upper end of lever extension 31a. This enables the ready release of pawls 21 which are engaged with one of the respective stops 22, 22a or 22b. The rope 36, that is attached to the upper end of lever extension 31a extends to a point within convenient reach of the operator of the tractor so that the Fresno may be efficiently and effectively operated by the driver of the tractor.

Upon pulling the rope 36, the lever extension 31a causes a knocking action on loop 31c and to lever 31 causing the bar 32 to lift the pawls 21 clear of one pair of the respective stops 22, 22a and 22b. After the pawls have cleared the stops, the rope 36 is released. This will permit the pawls 21 to return to normal positions under the influence of the spring device 34. Then, with the bowl 18 in contact with the ground, the bowl will continue to roll until the next succeeding stops are engaged, at which time the pawls will engage the next pair of respective stops, at the notches 21a, which will cause the pawls to stop the bowl, first in the position as shown in Fig. 2; next in the position as shown in Fig. 4; and lastly in the position as shown in Fig. 5.

However, it is to be explained, that the second designated position may be omitted by holding the hand lever forward until the stops 22a have passed the pawls 21; then, by releasing the lever 31, stops 22b will be engaged. If desired, the pawls 21 may be raised by the lever 31 and held in this position until the bowl 18 revolves both stops 22a and 22b past the pawls, thereby making possible the dumping of the entire load in a heap. The lever then can be released to engage the stops 22, after a complete revolution of the bowl 18.

When there is no pressure on the cylinder 24, the tension of the spring 25 will cause the swinging door 23 to remain open, so as to enable the free rotation of the cylindrical bowl 18, when it is being rotated to perform the dumping, spreading or filling operation. It will be seen that the present Fresno is designed to operate so as to rotate backward when a ditch is to be filled so as to enable the tractor to back the Fresno over the edge of the ditch to enable the dumping of the dirt into the ditch.

The notch 21a in each pawl 21 has square shoulders, as shown in Fig. 9. When the bowl 18 is rotated forward, one of the stops 22, 22a or 22b will engage the angular point of each pawl to lift the pawl 21 until the stop abuts with a long shoulder on the forward side of the pawl. This will cause the bowl 18 to stop rotating and be maintained in the position at which it is stopped. However, the notch 21a has a shorter shoulder on the rear side thereof, and the pawl will be caused to engage stop lug 22, 22a or 22b, in such manner as to prevent the reverse rotation of the bowl 18, should the tractor be reversed when the bowl is engaging the ground.

With the adjustable hitch connecting arrangement on the forward end of the tongue, it will be appreciated that, by varying the height of the bolt 9, the hitch may be adapted to tractors having either high or low drawbars. While the adjustment of the cutting depth of the blade is made by the stops and pawls as described above, a finer degree of adjustment can be made by the three holes in the hitch plates 8, as shown in Fig. 7. Each step of the stop and pawl adjustment is approximately three-fourths of an inch, each step of the stop 22, 22a or 22b and pawl adjustment will give approximately three-fourths of an inch deeper cut than the preceding adjustment, to the blade 20; however, this can be increased or decreased by approximately one fourth inch steps by moving the bolt 9 up or down in the holes provided in plate 8. This close adjustment of the depth of the cutter blade 20 saves much time in the loading of the scraper bowl 18, as minute variations can be made in the adjustment of the cutter blade, which enables the maximum use of the power capacity of the tractor motor without overloading such motor.

The linkage 12 allows short turning radius of the tractor 1, and with fenders or shields 4a provided on the frame members 4 to prevent the tractor tires from being damaged by coming into contact with the frame 4, it will be appreciated that very short turns can be made.

The provision of wheels 5—5 at the rear of the frame, renders the unit readily mobile, whereby the bowl full of dirt can be moved rapidly during the process of earth construction, more than has been practical heretofore. Also the ready mobility of the unit requires less power; therefore, a small tractor can be utilized, and the smaller tractor makes the unit more adaptable to close work, and less expensive to operate.

In the operation of the implement, the bolt 9 is connected in the proper holes in plates 8 so as to give the forward end portion 10 of the tongue 6 the correct vertical adjustment with respect to the draw bar 2. The link 12 is properly connected to the draw bar 2 as by bolts 13. The hose or conduit line 29 is connected to the control valve 28, and the control rope 36 is connected to the control lever extension 31a and leading to a point near the operator of the tractor. The Fresno is now ready for operation.

To position the bowl 18 for digging after the scraper load has been dumped, the frame 4 is lowered by hydraulic cylinder 15 until bowl 18 comes into contact with the ground, then by pulling rope 36 until the pawl 21 becomes disengaged from lug 22b, the rope may be then released and with the bowl 18 in contact relation with the ground upon forward movement of the tractor the bowl 18 will be caused to roll until lug 22 engages the tapered portion of pawl 21 which causes the lifting of the pawl 21 until lug 22 engages in notch 21a, at which the blade 20 will be correctly positioned for digging operations. The door 23 will be in raised position as indicated, due to the action of the spring 25. With the bowl in this position, having the edge of the blade extending downward into the ground, and with the door open, as the tractor is moved forward, the bowl will be filled.

The wheels 5 are positioned inwardly of the frame 2 in such manner that the maximum outer width of the tires of the wheels 5 will be wholly within the confines of the path cut by the scraper blade 20. In this way the wheels 5 will always travel on a planed surface and as the ditch gets deeper, the wheels will track within the cut surface so as to enable as many passes to be made as desirable without the necessity of making any adjustments in the depth of the cut of the Fresno or in its connection with the tractor.

When bowl 18 becomes filled, valve 28 is opened, which allows fluid pressure to be applied from pump P through valve 28 to conduits 29a and 29 simultaneously which will cause plunger 27 to move downward to urge swinging door 23 to close against cutter blade 20. This swinging door 23 will close with a scooping action to scoop the loose dirt that piles up ahead of the cutter blade 20 into the bowl, with the result that the bowl is normally filled to capacity, and the closing of the door 23 against the bowl causes the dirt to be moved back into the bowl for transportation of the load without loss of dirt, and with a well balanced load. As soon as the bowl 18 has been filled and the swinging door closed, the hydraulic medium is directed through line 29 into hydraulic cylinder 15, which will raise the scraper bowl clear of the ground, as indicated in Fig. 3. During the lifting of the front end of the frame 4, the tongue portion 6 is pivoted about the pivot pin 7 to cause the plates 8 to move into engagement with the lugs 11 so as to form a rigid tongue with respect to vertical movement, and to carry the loaded Fresno properly.

In practice the cylinder 24 which closes the swinging door 23 as provided with, substantially, a 1½″ hose, and the cylinder handles a load of approximately 300 lbs. (176 p. s. i.), including power to compress the door lifting spring 25. Cylinder 15, which lifts the loaded bowl, has an inside diameter of substantially 2″. The dirt load is approximately 18 cubic feet and weighs approximately 2000 pounds. The 2″ piston is loaded at approximately 637 p. s. i. Each of the cylinders 15 and 24, respectively, is fed from the same source through hose of the same size. Thus it will be understood that the small cylinder 24, with its lighter load (p. s. i.) will begin movement to close the gate 23 before the pressure necessary to lift the loaded Fresno is built up in the cylinder 15.

When two hydraulic cylinders unequally loaded (p. s. i.) are connected in parallel, the one requiring the least pressure will operate to full stroke before the other one starts to act regardless of the area of the piston. Hence, the cylinder 24 closes the gate 23 before the cylinder 15 begins to raise the loaded body. It will be understood that by inserting a foot operated valve to trip and hold the fluid in line 29 that the height that the gate 23 is lifted may be governed and the distribution of the dirt will also be governed.

With the Fresno in the position as described above, and shown in Fig. 3, it is possible to move the earth carried thereby at much greater speed than has been possible heretofore; and it can be either distributed or spread as desired, or it may all be dumped at a single point.

In order to spread evenly the dirt contained in the scraper bowl over a considerable area, the pressure is released from the lines 29, 29a, by manipulation of the control valve 28, which will release pressure on power devices 15 and 24. This will allow the plunger 27 to be moved upward under the tension of the spring 25; simultaneously, the pressure is released on the device 15, to retract the plunger thereof, which lowers the bowl 18 to the ground.

Then by pulling the rop 36, the lever 31 rocks the bar 32 to lift the pawls 21 out of engagement with the stop lugs 22. By the time this action is accomplished, the release of pressure from the line 29 has permitted the plunger of the power device 15 to move into the position shown in Fig. 2. However, since the pawls 21 are out of engagement with the stop lugs 22, the blade 20, or the surface that is in contact with the ground, will cause the bowl 18 to rotate until the pawls 21 engage the stop lugs 22a, as shown in Fig. 4.

With the stop lugs 22a adjusted in the desired hole in the end of the bowl, the scraper blade will be positioned the desired distance above the ground, so that the dirt discharged from the bowl will be spread evenly and smoothly until the supply is exhausted from the scraper bowl, at which time the lever 31 may be manipulated and held until the stops 22b pass the pawls 21. The lever 31 then may be released and the spring device 34 will urge the pawls 21 downward into the path of stop lugs 22. Simultaneously with this action, however, the valve 28 may be operated to lift the scraper bowl clear of the ground, without the necessity for stopping the tractor or of backing it in order to perform any special latching operation.

In this manner the operation of the Fresno can be handled without loss of time and with very little manual effort on the part of the operator.

An alternative operation can be performed, that of dumping the entire load of the scraper in one place. In order to perform this dumping action, the scraper is set in the carrying position, as shown in Fig. 3; the pressure is released from the lines 29a and 29 by opening the control valve 28, which will release the pressure on power devices 24 and 15 to cause the plunger 27 and door 23 to move upward, and the bowl 18 to be lowered into rolling contact with the ground whereupon, the rope 36 is pulled to actuate the lever 31 to raise pawls 21, and the lever is held in this position until stop lugs 22a are moved past the pawls 21. At that time the rope 36 is released to cause the pawls 21 to drop into the path of stop lugs 22b.

With the lower surface of the scraper in contact with the ground, the bowl 18 will be rotated into the position shown in Fig. 5, whereupon the lugs 22b will drop into the notches 21a to hold the bowl of the scraper in this position. This action will cause the dirt contained in the bowl 18 to be dumped. When the dumping has been completed, the lever 31 and pawls 21 are manipulated to bring the scraper back into the position shown in Fig. 2. The scraper then will be moved to the desired position, whereby upon the application of pressure to the lines 29 and 29a, the scraper is in position to be filled again, and the cycle is repeated.

I claim:

1. In an implement for moving earth, a frame, wheels mounted on one end of said frame, a tongue extending forward of said frame and having a hitch connection thereon, a scraper mounted within said frame and journaled thereon for rotary movement relative thereto, fluid pressure operated means mounted on the frame for raising the scraper and the frame, latch means on said scraper and said frame for selectively securing said scraper with respect to said frame, means remotely positioned from said latch for the operation thereof, said latch means on said frame having a notch therein to engage a lug on said scraper to retain said scraper against rotary movement, fluid pressure operated means mounted on said frame for closing the front of said scraper, and resilient means acting in opposition to said fluid pressure for opening said scraper.

2. In an earth moving implement, a frame, a pair of wheels mounted at one end of the frame and journaled for turning movement with respect thereto, a scraper mounted transversely of said frame and journaled for rotary movement with respect thereto, cooperating means on said frame and said scraper for selectively securing said scraper with respect to said frame, fluid pressure actuated means on said frame for raising and lowering said frame, said means comprising a single acting cylinder and plunger connected with the frame and having a fluid supply conduit having a control valve therein said conduit adapted to extend to a source of fluid pressure, a second single acting fluid cylinder and plunger connected with the frame in parallel with the first-mentioned fluid cylinder and plunger and adapted to be connected with said source of fluid pressure, and a door for closing the scraper and connected with said second fluid cylinder and plunger.

3. In an earth moving implement, a frame, a pair of wheels mounted at one end of the frame and journaled for turning movement with respect thereto, a scraper mounted transversely of said frame and journaled for rotary movement with respect thereto, means for selectively securing said scraper with respect to said frame, fluid pressure actuated means for raising and lowering said frame, said means comprising a single acting cylinder and plunger connected with the frame and having a fluid supply conduit and a control valve therein adapted to extend to a source of fluid pressure, a second single acting fluid cylinder and plunger connected with the frame in parallel with the first-mentioned fluid cylinder and plunger and adapted to be connected with said source of fluid pressure, and a door for closing the scraper and connected with said second fluid cylinder and plunger, said cylinders having different cross-sectional areas to provide different raising frequencies due to fluid resistance, said cylinders being controlled independently of each other by the application of pressure to said conduit by said single valve.

4. In an earth moving implement, a frame, a pair of wheels mounted at one end of the frame and journaled thereon for turning movement with respect thereto, a scraper mounted transversely of said frame and journaled for rotary movement with respect thereto, fluid pressure means for raising and lowering said frame, said means comprising a single acting cylinder and plunger connected with a conduit having a valve therein, and said conduit adapted to lead to a source of fluid pressure, a second single acting fluid cylinder and plunger connected with the frame in parallel with the first-mentioned fluid cylinder and responsive to said fluid pressure, and a door for closing the scraper and connected with said second fluid cylinder and plunger, said cylinders having different cross sectional areas which will give a difference in fluid resistance resulting in different raising frequencies, said cylinders being controlled by the application of pressure to said conduit by said single valve.

5. In an earth moving implement, a frame, a tongue connected with the forward end of said frame and extending therefrom, means for supporting the rear end of said frame, said tongue having pivotal connection with said frame so the front end portion of said frame may be raised or lowered by means of fluid pressure, a scraper rotatably mounted in said frame and having a door adapted to selectively close said scraper, fluid pressure cylinder means for closing said door, and means acting between said frame and said door to hold said door open after the release of said fluid pressure.

6. In an implement for moving earth, a frame, a scraper mounted within said frame and journaled thereon for rotary movement relative thereto, latch means on said scraper and said frame for selectively securing said scraper with respect to said frame, a lever for operating said latch having a lever extension pivotally mounted thereon, abutment means on said lever in the path of movement of said lever extension whereby quick rotation of said lever extension causes engagement thereof against said abutment means to disconnect the said latch means.

7. In an earth moving implement, a frame, a pair of wheels mounted at one end of said frame and journaled thereon for turning movement with respect thereto, a scraper mounted transversely of said frame and journaled for rotary movement with respect thereto, a door for said scraper, said door extending transversely of and being pivotally mounted on said frame, a single-acting fluid cylinder mounted on said frame and having a piston slidably mounted therein, a plunger having one of its ends connected to said piston and the other end thereof connected with said door, said fluid cylinder upon receipt of fluid under pressure on one side of said piston and said plunger actuates said door to move said door to its closed position relative to said scraper, and an air accumulator connected with said fluid cylinder on the other side of said piston into which air is compressed by said piston as said door is moved to its closed position, whereby upon release of fluid pressure at said one side of said piston said compressed air expands to force said piston and said plunger to move said door to its open position relative to said scraper.

8. In an earth moving implement, a frame, a pair of wheels mounted at one end of said frame and journaled thereon for turning movement with respect thereto, a scraper mounted transversely of said frame and journaled for rotary movement with respect thereto, a door for said scraper, said door extending transversely of and being pivotally mounted on said frame, a single-acting fluid cylinder mounted on said frame and having a piston slidably mounted therein, a plunger having one of its ends connected to said piston and the other end thereof connected with said door, said fluid cylinder upon receipt of fluid under pressure on one side of said piston actuates said door to move said door to its closed position relative to said scraper, an air accumulator connected with said fluid cylinder on the other side of said piston into which air is compressed by said piston as said door is moved to its closed position, whereby upon release of fluid pressure at said one side of said piston said compressed air expands against the other side of said piston to move said door to its open position relative to said scraper, and resilient means under tension connected to said frame and said door to provide additional force to move said door from its closed position to its open position.

CHARLES H. BROWN.

References Cited in the file of this patent
UNITED STATES PATENTS

| Number | Name | Date |
|---|---|---|
| 1,892,907 | Sjogren et al. | Jan. 3, 1933 |
| 1,899,118 | Sjogren et al. | Feb. 28, 1933 |
| 2,015,880 | Wold | Oct. 1, 1935 |
| 2,064,023 | Maloon | Dec. 15, 1936 |
| 2,099,435 | Davenport | Nov. 16, 1937 |
| 2,121,240 | Austin | June 21, 1938 |
| 2,196,690 | Barrett | Apr. 9, 1940 |
| 2,293,636 | Berner et al. | Aug. 18, 1942 |
| 2,308,193 | Miskin | Jan. 12, 1943 |
| 2,348,117 | Elliott | May 2, 1944 |
| 2,380,021 | Brown et al. | July 10, 1945 |
| 2,386,192 | Brimhall | Oct. 9, 1945 |
| 2,441,744 | Barker | May 18, 1948 |
| 2,445,260 | Brimhall | July 13, 1948 |

FOREIGN PATENTS

| Number | Country | Date |
|---|---|---|
| 104,497 | Australia | July 21, 1938 |